3,117,867
LIVESTOCK FEED
Bernward Garre, Ludwigshafen (Rhine), Germany, assignor to Gebruder Giuline G.m.b.H., Ludwigshafen (Rhine), Germany, a corporation of Germany
No Drawing. Filed July 19, 1960, Ser. No. 43,718
Claims priority, application Germany Dec. 28, 1959
10 Claims. (Cl. 99—2)

The present invention relates to a livestock feed and, more particularly, to a livestock feed mixed with an effective amount of carbamide phosphate as well as to a method of feeding livestock with feeds containing effective amounts of the additive in accordance with the invention.

It is known that phosphates of various chemical constitutions may be used for the treatment of meat and meat products. In this connection, by means of such phosphates a swelling of the meat fibers may be obtained, for example. Moreover, when using alkaline phosphates a fat emulsification may also be effected. Generally, in the broad field of therapy, phosphates have found application where the elimination of manifestations of deficiency in the animal organism was sought. Phosphates are also added the soil so as to replenish the soil with phosphate compounds used up during agricultural growth of plants and crops.

A particular problem which has been encountered in practice is that of the sterility of livestock and especially female fur animals as well as the comparatively poor utilization of the animal or livestock feed. In this regard, it is well known that in the breeding of fur-bearing animals, a significant number of the femal animals, for reasons not too well understood, do not bear young, and are thus considered sterile. In consequence of this phenomenon, the efficient, economical breeding of fur animals, for instance, is considerably adversely influenced.

It is also known that various phosphates contained in animal feeds are not adequately assimilated by the animal such that poor utilization of the feed and consequently poor growth rate of the animal is manifested. In this regard, it is known that various phosphate compounds, usually found in livestock or animal feeds are not readily soluble, and therefore reflect a deficiency in the utilization of the substituents in the feed. Consequently, the rate of growth of the livestock or animals is adversely affected.

It is an object of the present invention to overcome the foregoing drawbacks and to provide a suitable feed containing effective additive ingredients as well as a method of feeding animals with feeds containing these additive ingredients.

Other and further objects of the invention will become apparent from a study of the within specification and accompanying examples.

It has been found, in accordance with the present invention, that a particularly superior livestock feed may be provided by adding to a nutrient feed an effective amount of carbamide phosphate. The amount of carbamide phosphate may range from 0.1 to 1.5% by weight based on the weight of the feed. The carbamide phosphate or urea phosphate contemplated may be expressed by the formula $CO(NH_2)_2 \cdot H_3PO_4$.

While the carbamide phosphate additive may be incorporated in the feed in the foregoing range with respect to dry, commercial standard feed, the type of carbamide phosphate addition is not crucial. The additive must merely be incorporated in the feed in a form insuring effective distribution of the same throughout the feed. Normally, this is accomplished by providing the additive in the feed in finely divided form.

Nevertheless, the carbamide phosphate may also be added to the feed in solution form. Thus, since the solubility of carbamide phosphate is very favorable, 150 grams dissolving in 100 grams of water at 20° C., aqueous solutions, are also preferred.

When nutrient animal or livestock feeds containing carbamide phosphate in accordance with the invention were administered to livestock or animals, no adverse or damaging influence on the state of the health of said livestock or animals could be observed.

As will be appreciated, according to the type of animals to be fed, the feed will vary in its composition. All animal feeds generally contain protein in considerable quantities. Thus, poultry feed contains protein in an amount of from 22 to 47%, hog feed contains protein in an amount of from 13 to 47% and cattle feed contains protein in an amount of from 15 to 30%, generally. High photein-containing feeds usually include feed meal, various types of cereals, grains and the like, potatoes, meat meal, fish meal and similar constituents.

Furthermore, inorganic ingredients are generally also included in animal or livestock feeds, such as feed lime, bone meal, super-phosphates, tricalcium phosphate as well as other substituents, similarly providing a source of calcium and phosphorus. In addition, to these, vitamin-containing agents are also often included, such as yeast, liver and the like. In some cases various vitamins are also included in pure form. In certain instances, animal fats, provided in pure form, or present in meat wastes, are also incorporated in the feed.

Table I illustrates suitable feeding compositions applicable in specific instances, i.e., for feeding cattle, hogs, mink and poultry.

TABLE I

| Cattle | Hogs | Mink | Poultry |
| --- | --- | --- | --- |
| 30% feed meal. | 20% albuminous feed. | 30% poultry wastes. | 30% fish meal. |
| 20% oil cakes. | 30% feed meal. | 10% horse meat. | 25% legumes. |
| 30% legumes. | 20% dry yeast. | 30% fish. | 15% dry yeast. |
| 15% molasses. | 10% feed-bone coarse meal. | 10% liver. | 5% charcoal. |
| 2% feed lime. | 5% feed lime. | 20% cereals. | 25% soy-extract coarse meal. |
| 3% dry yeast. | 15% potatoes. | | |

The following example is set forth in order to illustrate the invention and it will be understood that the invention is not to be limited thereby.

*Example*

40 rats (20 male and 20 female rats) which were 4 weeks old, having an average weight of from 40 to 50 grams, were fed for 8 weeks with 0.5 or 1% carbamide phosphate admixed with a standard commercial Latz rat feed of the following composition:

DRY BASIS

| | Percent |
| --- | --- |
| NaCl | 0.5 |
| Norwegian veterinary cod liver oil | 1.0 |
| Coarse bone meal, fine | 3.0 |
| Lucerne hay meal | 2.0 |
| Fish meal | 2.0 |
| Brewers' dry yeast | 3.5 |
| Skim milk powder | 5.0 |
| Whole milk powder | 5.0 |
| South American dry cattle meat, ground | 5.0 |
| Extracted soy coarse meal | 5.0 |
| Barley whole grain meal | 15.0 |
| Wheat whole grain meal | 53.0 | whereupon the following results were obtained:

TABLE IIa

| Group | No. of Females | Percent of Females Sterile | Total No. of Young Born |
|---|---|---|---|
| Control | 20 | 10 | 114 |
| 0.5% carbamide phosphate | 20 | 5 | 179 |
| 1% carbamide phosphate | 20 | 0 | 173 |

TABLE IIb

| Group | Weight increase per each gram of feed consumed in 8 weeks | Weight increase in percent with reference to the control |
|---|---|---|
| Control: | | |
| Males | 0.243 | |
| Females | 0.179 | |
| 0.5% carbamide phosphate: | | |
| Males | 0.268 | 10.3 |
| Females | 0.210 | 17.3 |
| 1% carbamide phosphate: | | |
| Males | 0.252 | 3.7 |
| Females | 0.222 | 24.0 |

It will be seen from Table II that upon administering to the animals the carbamide phosphate of the invention with the feed, the number of sterile females was considerably decreased, even to zero, as opposed to the control animals who received no carbamide phosphate over the period of the test.

As specifically shown in Table IIb, it is also demonstrated that the animals who received the carbamide phosphate together with the feed exhibited a weight increase per gram of feed consumed significantly above that found in the animals who received no carbamide phosphate. Thus, a more effective and efficient feed utilization by the animals is attained when the carbamide phosphate in accordance with the invention is administered to the animals with the feed.

In accordance with a further feature of the invention, it has been found that animal feeds which contain phosphate or to which orthophosphates, such as dicalcium phosphate, crude phosphate, super-phosphate and the like, are added in the known manner, undergo an improvement in utilization by the livestock or animal where the feed contains condensed phosphates in admixture with carbamide phosphate.

Condensed phosphates of various types have been incorporated in animal feeds, but in every case it was found that the condensed phosphates were very poorly resorbed by the animal organism. Consequently, it was always felt that condensed phosphates were unsuitable for feed purposes.

In accordance with the invention, it was surprisingly found that condensed phosphates when used with carbamide phosphate possess a considerable action on the ability of phosphates which are present in the feed or added thereto to be resorbed by the livestock or animal body.

In this connection, it is known that particularly difficulty soluble inorganic compounds are digested and resorbed by the body to only a comparatively small extent. Although the phosphorus content, determined analytically, of the feed is sufficiently high or even higher than that required for normal animal growth, the animal body may well suffer from phosphorus deficiency. For example, the Latz standard preparation of rat feed (see the example) contains 1.5% of phosphorus. While damage in the animal body, due to phosphorus deficiency, is seen to take place at a level of about 1% resorbed phosphorus, rat feeds containing 1.5% phosphorus may be deficient in phosphorus in view of the fact that a major part of the phosphorus content is in a form which cannot be readily used by the animal body.

Where the animal feed is provided with condensed phosphate in accordance with the invention, however, phosphorus deficiency with respect to the animal utilization of phosphorus is completely avoided. Instead, the administration of feeds containing condensed phosphates in accordance with the invention demonstrated increases in bodily capacity, efficiency and the like.

It is believed that the condensed phosphate, in accordance with the invention, serves to convert or break up the normal phosphate content present in the feed such that the same will thereby be better digested and resorbed by the livestock or animal body. The better resorption ability of these phosphates is based upon the more favorable water-solubility effects, since it is known that phosphates may only be resorbed in ionized form.

Dicalcium phosphate, which to a large extent is placed into livestock and animal feeds, is only slightly soluble in water. If, for example, dicalcium phosphate is added to 100 ml. of water at room temperature, under stirring until a weak turbidity occurs, there will only be present in the filtrate 0.02 gram of dissolved dicalcium phosphate and/or 0.004 gram of phosphorus. On the other hand, if dicalcium phosphate is slowly added under the same conditions to a 2% solution of tetrasodiumphosphate (sodium polyphosphate), upon reaching weak turbidity or opalescence, then the filtrate will be shown to have 0.74 gram of dicalcium phosphate and/or 0.148 gram of phosphorus. Upon removal of the portion of phosphorus dissolved through the water alone, it will be found that additionally 0.144 gram of phosphorus remain dissolved by means of the sodium polyphosphate.

Thus, the foregoing results indicate that contrary to the generally accepted opinion, condensed phosphate may be incorporated in animal or livestock feeds with success, i.e., in all cases where poorly digestible and resorbable phosphates exist in the feed.

Preferably, the condensed phosphates are used in combination with the carbamide phosphate whereby surprisingly the resorption effect of carbamide phosphate is still further increased. In fact, a synergistic effect takes place when both the condensed phosphate and carbamide phosphate are used together, such that the livestock or animals effectively utilize their food so as to increase their rate of growth and also to prevent sterility. It may be considered that the condensed phosphates serve to disperse the carbamide phosphate whereby the carbamide phosphate becomes better distributed and therefore better utilized in the animal organism. Also, the carbamide phosphate may be better retained by adhesion with respect to the feed used.

Conveniently, in accordance with the invention a mixture of carbamide phosphate and condensed phosphates, such as alkaline polyphosphates, including tetrasodiumphosphate ($Na_4P_2O_7$) may be added to the feed in an amount of from .03 to 2% by weight based on the weight of the feed. In this mixture the amount of carbamide phosphate present is preferably at least 10% by weight of said mixture, this amount being at least 0.1% by weight based on the weight of the feed.

Mixtures which may be used in accordance with the invention in this regard are set forth in Table III:

TABLE III

| 1 | 2 |
|---|---|
| 52% $Na_4P_2O_7$<br>24% $Na_5P_3O_{10}$<br>8% Tetrapolyphosphate<br>7% $KPO_3$<br>9% $CO(NH_2)_2 \cdot H_3PO_4$<br>cp.=2.0<br>pH=8.6 | 72.3% $Na_4P_2O_7$<br>9.0% $KPO_3$<br>8.0% $CO(NH_2)_2 \cdot H_3PO_4$<br>10.7% $Na_3PO_4$<br>cp.=2.0<br>pH=9.2 |

With respect to Table III, it will be appreciated that the cp. (centipoise) value was obtained using a Höppler viscosimeter wherein the time is measured for the sinking of a sphere through the liquid in the well known manner.

Thus, the present invention contemplates the use of livestock or animal feed deficient in the normal growth requirement of resorbable phosphorus containing an effective amount of carbamide phosphate sufficient to compensate substantially for the deficiency. Of course, the feed may additionally include an effective amount of a condensed phosphate in admixture with the carbamide phosphate. Also, in this same regard a livestock or animal feed deficient in the normal fertility and reproduction requirement may be used, in accordance with the invention, where the same contains an effective amount of carbamide phosphate sufficient to compensate substantially for the deficiency. Moreover, such feed may additionally contain an effective amount of a condensed phosphate in admixture with the carbamide phosphate. The present invention also, therefore, contemplates a method of feeding normally healthy livestock or animals which includes adding to the livestock or animal feed an amount of carbamide phosphate and/or condensed phosphate, effective to increase substantially the growth rate of the animal.

It will be appreciated that the terms "livestock" and "animal" are meant to be synonymous and connote all types of animals, including fur-bearing and non-fur-bearing animals such as mink, poultry, hogs, cattle, mice and rates, and the like, all these animals and livestock to be considered being familiar to the artisan.

Among the condensed phosphates which may be used in admixture with carbamide phosphate in accordance with the invention are all condensed phosphates which are formed through intermolecular water separation, i.e., phosphates containing more than two P-atoms in the molecule, including alkaline polyphosphates and the like, either alone or in admixture with one another.

What is claimed is:

1. Livestock feed comprising a nutrient feed mixed with from 0.1 to 1.5% by weight, based on the weight of the feed, of carbamide phosphate, said feed additionally including an effective amount of a condensed phosphate in admixture with the carbamide phosphate, said carbamide phosphate and condensed phosphate being present in an amount sufficient to compensate substantially for any deficiency in the normal growth requirement of resorbable phosphorus in livestock fed with the feed.

2. Livestock feed according to claim 1 wherein the admixture of carbamide phosphate and condensed phosphate is present in an amount of from 0.3 to 2% by weight, based on the weight of the feed.

3. Livestock feed according to claim 1 wherein said condensed phosphate includes alkali polyphosphate, and the amount of carbamide phosphate present is at least 10% by weight of said admixture.

4. Livestock feed according to claim 2 wherein said condensed phosphate is $Na_4P_2O_7$ and said carbamide phosphate is $CO(NH_2)_2 \cdot H_3PO_4$.

5. Livestock feed according to claim 2 wherein said carbamide phosphate is in dry, divided form.

6. In the method of feeding normally healthy livestock, the improvement which comprises supplying the livestock with a feed otherwise deficient in the normal growth requirement of resorbable phosphorus but mixed with from 0.1 to 1.5% by weight, based on the weight of the feed, of carbamide phosphate, said feed additionally including an effective amount of a condensed phosphate in admixture with the carbamide phosphate, said carbamide phosphate and condensed phosphate being present in an amount sufficient to compensate substantially for the deficiency in the normal growth requirement of resorbable phosphorus in the feed.

7. Improvement according to claim 6 wherein the admixture of carbamide phosphate and condensed phosphate is present in an amount of from 0.3 to 2% by weight, based on the weight of the feed.

8. Improvement according to claim 7 wherein said condensed phosphate is $Na_4P_2O_7$ and said carbamide phosphate is $CO(NH_2)_2 \cdot H_3PO_4$.

9. Improvement according to claim 7 wherein said condensed phosphate includes alkali polyphosphate.

10. In the method of feeding normally healthy livestock, the improvement which comprises supplying the livestock with a feed otherwise deficient in the normal fertility and reproduction requirements but mixed with from 0.1 to 1.5% by weight, based on the weight of the feed, of carbamide phosphate, said feed additionally including an effective amount of a condensed phosphate in admixture with the carbamide phosphate, said carbamide phosphate and condensed phosphate being present in an amount sufficient to compensate substantially for the deficiency in the normal fertility and reproduction requirement in the feed.

References Cited in the file of this patent

UNITED STATES PATENTS

| | | |
|---|---|---|
| 2,630,386 | Walker | Mar. 3, 1953 |
| 2,687,354 | Gribbins | Aug. 24, 1954 |
| 2,748,001 | Anderson | May 29, 1956 |

UNITED STATES PATENT OFFICE
CERTIFICATE OF CORRECTION

Patent No. 3,117,867　　　　　　　　　　　　　January 14, 1964

Bernward Garre

It is hereby certified that error appears in the above numbered patent requiring correction and that the said Letters Patent should read as corrected below.

In the grant, lines 2 and 12, and in the heading to the printed specification, line 4, name of assignee, for "Gebruder Giuline G.m.b.H.", each occurrence, read -- Gebruder Giulini G.m.b.H. --; column 1, line 25, after "added" insert -- to --; column 2, line 17, for "photein-containing" read -- protein-containing --; column 5, line 24, for "rates" read -- rats --.

Signed and sealed this 23rd day of June 1964.

(SEAL)
Attest:

ERNEST W. SWIDER
Attesting Officer

EDWARD J. BRENNER
Commissioner of Patents